United States Patent
Englert et al.

(10) Patent No.: US 9,834,187 B2
(45) Date of Patent: Dec. 5, 2017

(54) TRAILER SWAY CONTROL WITH TRAILER BRAKE INTERVENTION

(75) Inventors: Kirk Englert, Dearborn, MI (US);
Doug Marsden, Dearborn, MI (US);
Erik Chubb, Chicago, IL (US); David Messih, Farmington Hills, MI (US);
Paul Schmitt, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2150 days.

(21) Appl. No.: 11/622,129

(22) Filed: Jan. 11, 2007

(65) Prior Publication Data

US 2008/0172163 A1    Jul. 17, 2008

(51) Int. Cl.
*B60T 8/60* (2006.01)
*B60T 8/17* (2006.01)
*B60T 7/20* (2006.01)
*B60T 8/1755* (2006.01)

(52) U.S. Cl.
CPC .............. *B60T 8/1708* (2013.01); *B60T 7/20* (2013.01); *B60T 8/1755* (2013.01); *B60T 2230/06* (2013.01)

(58) Field of Classification Search
CPC ........ B60T 7/20; B60T 8/1708; B60T 8/1755; B60T 2230/06
See application file for complete search history.

(56) References Cited

U.S. PATENT DOCUMENTS

| | | | |
|---|---|---|---|
| 3,908,782 A | 9/1975 | Lang et al. | |
| 4,023,864 A | 5/1977 | Lang et al. | |
| 4,232,910 A | 11/1980 | Snyder | |
| 6,499,814 B1 | 12/2002 | Mixon | |
| 6,523,911 B1 | 2/2003 | Rupp et al. | |
| 6,705,684 B1 | 3/2004 | Garvey | |
| 6,959,970 B2 | 11/2005 | Tseng | |
| 6,966,613 B2 | 11/2005 | Davis | |
| 7,272,481 B2 * | 9/2007 | Einig et al. | 701/70 |
| 7,302,332 B2 * | 11/2007 | Nenninger | 701/72 |
| 2002/0107627 A1 * | 8/2002 | Funke et al. | 701/70 |
| 2003/0117011 A1 | 6/2003 | Ackley | |
| 2004/0249547 A1 | 12/2004 | Nenninger | |
| 2005/0206224 A1 | 9/2005 | Lu | |
| 2005/0206229 A1 | 9/2005 | Lu et al. | |
| 2005/0206233 A1 | 9/2005 | Offerle et al. | |
| 2005/0234603 A1 | 10/2005 | Bale et al. | |

FOREIGN PATENT DOCUMENTS

DE    4207903 A1    9/1993

* cited by examiner

*Primary Examiner* — Xuan Lan Nguyen
(74) *Attorney, Agent, or Firm* — Angela M. Brunetti; Raymond Coppiellie

(57) ABSTRACT

A control system for a vehicle includes a speed sensor that generates a vehicle speed signal. A sway detection sensor generates an oscillation signal. A brake control is coupled to a vehicle brake and is associated with a trailer brake. A controller is coupled to a stability control system and brakes one or more of the vehicle brake and the trailer brake and in response to the oscillation signal.

27 Claims, 4 Drawing Sheets

TRAILER SWAY CONTROL WITH TRAILER BRAKE INTERVENTION

TECHNICAL FIELD

The present invention relates generally to vehicle dynamic and stability control systems. More particularly, the present invention is related to the mitigation of yaw oscillations experienced when trailering, especially during straight-line or steady state (sub-limit) turning vehicle operation.

BACKGROUND

Several electronic stability control systems currently exist. Example stability control systems are yaw stability control systems (YSC) and roll stability control systems (RSC). The stability control systems are utilized to maintain controlled and stable vehicle operations for improved vehicle and occupant safety. The stability control systems are often used to maintain vehicle tractions and to prevent or mitigate a roll over event.

YSC systems typically compare the desired direction of the vehicle, based upon the steering wheel angle, and the direction of travel. By regulating the amount of braking at each corner of the vehicle, the desired direction of travel may be maintained.

While towing, a vehicle-trailer combination has a physical phenomenon based on the different parameters of the vehicle and trailer such that at a certain speed lateral disturbances to the trailer may cause divergent trailer yaw oscillations. This disturbance may be a road bump, crosswinds, aerodynamic loads caused by a passing vehicle, etc. The trailer yaw oscillations may develop into an unstable situation, which has an associated speed that is described as the critical speed. The oscillations experienced by the trailer are transferred through the trailer hitch to the vehicle. The oscillation motion of the trailer occurs about the vehicle vertical axis, known as the yaw axis.

One technique for minimizing the oscillations, and thus trailer sway is to apply all tow vehicle brakes and reduce engine torque in order to bring the vehicle combination below the critical speed as quickly as possible. Another technique is to actively brake selected wheels of the vehicle to counteract the oscillations and/or to counteract the forces exerted on the vehicle by the trailer. Although the stated techniques provide some desired sway reduction, they are performance limited by the brake actuation capabilities of the tow vehicle. Tow vehicle braking alone causes an increase in trailer hitch force on the tow vehicle, which causes an immediate reduction in vehicle stability. Application of the vehicle brakes at the extreme ends of the trailer sway motion may increase the instability and cause the trailer to sway further into or towards the vehicle. In certain situations such a technique is incapable of adequately minimizing such oscillations and/or minimizing such oscillations in a desired time frame.

Thus, there exists a need for an improved stability control system that provides improved performance and operating efficiency for trailerability of a vehicle.

SUMMARY

One embodiment of the present invention provides a control system for a tow vehicle. The control system includes a speed sensor that generates a vehicle speed signal. A sway detection sensor on the vehicle generates an oscillation signal. A trailer brake controller is coupled to a vehicle brake and is associated with trailer brakes. A controller is coupled to a stability control system and brakes one or more of the tow vehicle brakes and the trailer brakes, in response to the oscillation signal.

Another embodiment of the present invention provides a control system for a tow vehicle. The control system includes a sway detection sensor that generates an oscillation signal. A trailer brake controller is coupled to a vehicle brake and is associated with trailer brakes. This controller is coupled to the stability control system and applies a proportionally greater braking force with the trailer brakes than with the vehicle brake in response to the oscillation signal.

The embodiments of the present invention provide several advantages. One advantage provided by an embodiment of the present invention is the incorporation of a trailer brake controller that operates trailer brakes upon detection of vehicle/trailer swaying. The trailer brakes may be applied alone or in addition to vehicle brakes. Trailer braking is superior to vehicle braking in that it creates tension (rather than compression) between a vehicle and trailer, which lowers critical speed, minimizes oscillations and allows a vehicle to maintain its intended course and stable operation.

Another advantage provided by an embodiment of the present invention is a control system that incorporates trailer brake control in a stability control trailer-sway function.

The above-stated advantages allows for quicker and safer trailer sway oscillation damping.

The present invention itself, together with further objects and attendant advantages, will be best understood by reference to the following detailed description, taken in conjunction with the accompanying drawing.

BRIEF DESCRIPTION OF THE DRAWINGS

For a more complete understanding of this invention reference the embodiments illustrated in greater detail in the accompanying figures and described below by way of examples of the invention wherein.

DETAILED DESCRIPTION

Figure 1:
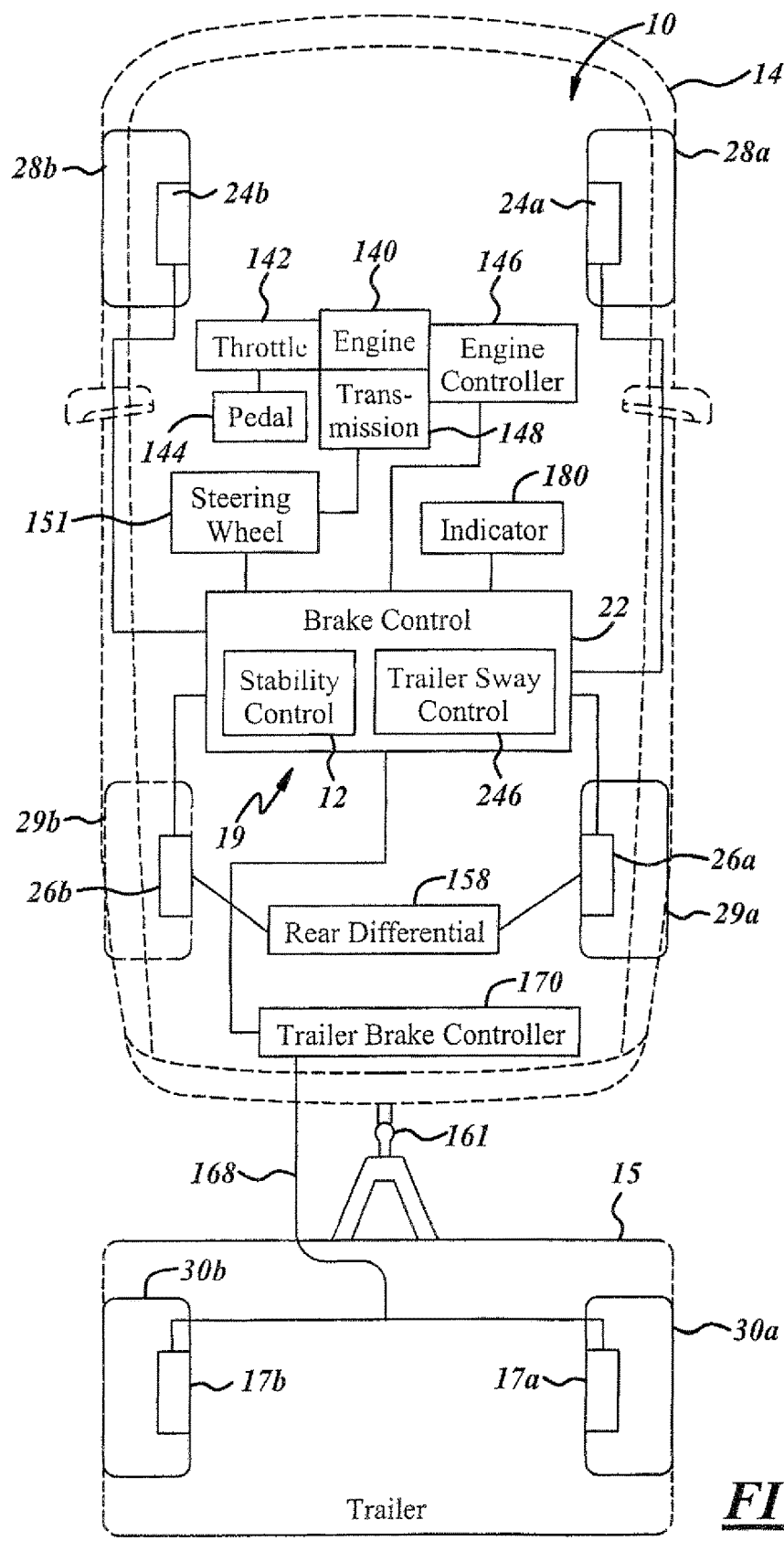
FIG. 1 is a block diagrammatic view of a control system, including a vehicle and trailer stability control system, in accordance with an embodiment of the present invention.

In the following figures the same reference numerals will be used to identify the same components. The present invention may be used in conjunction with vehicle control systems including a yaw stability control (YSC) systems, roll stability control (RSC) systems, as well as in conjunction with the trailer brake controller. The present invention is also described with respect to an integrated sensing system (ISS), which uses a centralized motion sensor cluster such as an inertial measurement unit (IMU) and other available, but decentralized sensors. Although a centralized motion sensor, such as an IMU, is primarily described, the techniques described herein are easily transferable to using the other discrete sensors.

Also, a variety of other embodiments are contemplated having different combinations of the below described features of the present invention, having features other than those described herein, or even lacking one or more of those features. As such, it is understood that the invention can be carried out in various other suitable modes.

In the following description, various operating parameters and components are described for one constructed embodiment. These specific parameters and components are included as examples and are not meant to be limiting.

Referring now to FIG. 1, a block diagrammatic view of a control system 10, including a vehicle stability control system 12, for a vehicle 14 in accordance with an embodiment of the present invention is shown. The control system 10, via the stability control system 12, monitors and mitigates oscillations or swaying of the vehicle 14 and trailer 15 to provide operating stability. The stability control system 12 may be or include a RSC system, an ESC system, a YSC system, or some other stability control system known in the art. Several of the stated control systems are shown and described with respect to FIG. 2. The control system is in communication with and controls the operation of the trailer brakes 17a and 17b.

Figure 2:
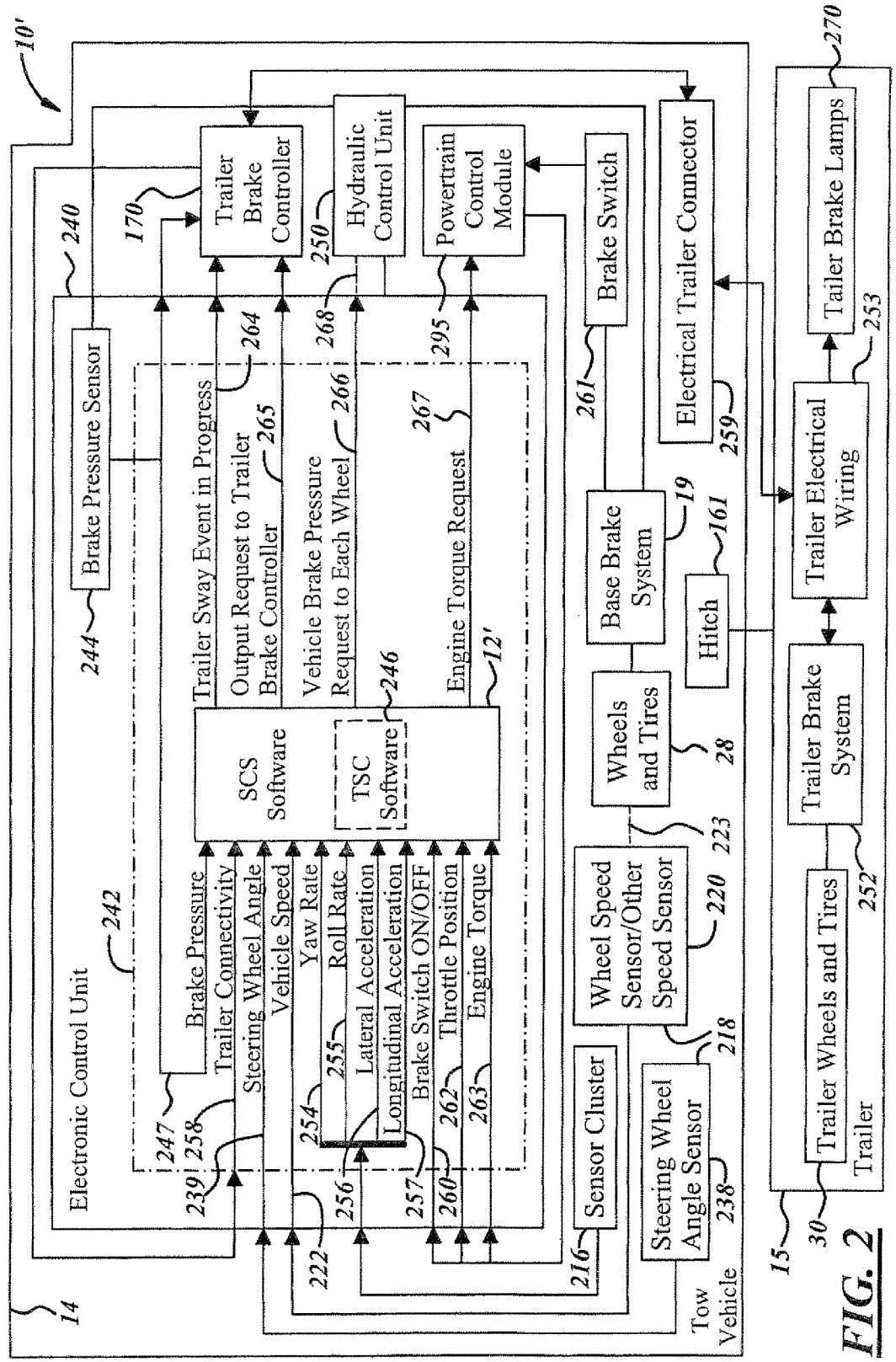
FIG. 2 is a block diagrammatic view of a stability control system in accordance with an embodiment of the present invention.

The stability control system (SCS) 12 is coupled to a braking circuit 19. The main brake controller 22 comprises an electronic control unit (ECU) 240 and a hydraulic control unit (HCU) 250, the electronic control unit containing the software for both SCS 12 and trailer sway control (TSC) 246 (FIG. 2). The main brake controller 22 is used to actuate front vehicle brakes 24a and 24b and rear vehicle brakes 26a and 26b. The vehicle brakes 24 and 26 are associated with the wheels 28a, 28b, 29a and 29b. The trailer brakes 17 are associated with the wheels 30a and 30b. The brakes 17, 24, and 26 may be independently actuatable through the brake control 22. Brake controller 22 may control the hydraulic system of the vehicle. Of course, electrically actuatable brakes may be used in the present invention and, as shown, are used on the trailer 15. The SCS 12 is coupled to a trailer brake controller 170, which may be integrated as part of the brake controller 22. The trailer brake controller 170 is used in actuating the trailer brakes 17a and 17b.

The drivetrain circuit 21 includes an internal combustion engine 140 or other engine known in the art such as diesel, hybrid, etc., with an associated transmission 148. Engine 140 may have a throttle device 142 coupled thereto, which is actuated by a foot pedal 144. The throttle device 142 may be part of a drive-by-wire system or by a direct mechanical linkage between the pedal 144 and the throttle device 142. The engine 140 may include an engine controller 146. The engine controller 146 may be an independent controller or part of the controller 10. The engine controller 146 may be used to reduce or increase the engine power.

A steering wheel 151 provides directional input for the vehicle operator in a known manner.

Various types of differentials may also be used depending on the desired vehicle performance and use. The differential may be controlled by the controller 10.

The controller 10 may be microprocessor based such as a computer having a central processing unit, memory (RAM and/or ROM), and associated input and output buses. The controllers may be application-specific integrated circuits or may be formed of other logic devices known in the art. The other controllers 15, 146, 170, 22, 12 may each be a portion of a central vehicle main control unit, an interactive vehicle dynamics module, a restraints control module, a main safety controller, a control circuit having a power supply, combined into a single integrated controller, or may be stand-alone controllers as shown. The controller 10, as well as, the brake control 22, the engine controller 146, and the trailer brake controller 170 may be configured to be mounted and located within a vehicle dashboard or vehicle panel or in some other location on the vehicle 14.

The trailer 15 is towed behind vehicle 14. The trailer 15 may include a hitch 161 that is hitched to the vehicle 14. Although the trailer is shown as having a pair of wheels 30 and a pair of brakes 17, it may have any number of axles/wheels and brakes. A harness 168 may be used to couple the electrical components such as the brakes 17 and the trailer lights to the electrical system of the vehicle 14. Of course, the communication between the trailer and the vehicle may be wireless in which case both the vehicle and trailer would have transceivers (not shown) for such communication. The vehicle brakes and the trailer brakes may each be operated and controlled separately, independently, in unison, simultaneously, dependently, or in some other format depending upon the situation.

The harness 168 couples the trailer 160 to the trailer brake controller 170. The trailer brake controller 170 is capable of controlling the trailer brakes 17 together or independently and in collaboration with the vehicle brakes 24 and 26.

The control system also includes an indicator 180, which may be used to indicate to a vehicle operator various vehicle and trailer status information. The indicator 180 may include cluster message center or telltale display, or other indicator known in the art. In one embodiment of the present invention, the indicator 180 is in the form of a heads-up display and the indication signal is a virtual image projected to appear forward of the vehicle 14. The indicator 180 provides a real-time image of the target area to increase the visibility of the objects during relatively low visible light level conditions without having to refocus ones eyes to monitor an indication device within the vehicle 14.

Referring now to FIG. 2, a block diagrammatic view of the control system 10 in accordance with an embodiment of the present invention is shown. The stability control system 12' may be part of a vehicle dynamics control or an active safety system. The control system 10' includes powertrain and braking control systems located on the vehicle 14 and the trailer 15. The stability control system 12' may monitor the forces and moments exerted or experienced by the vehicle 14 and the trailer 15. The vehicle wheel/tires 28 and the trailer wheels/tires 30, respectively, are shown and may be part of the vehicle 14 and the trailer 15.

The main brake controller 22 includes the electronic control unit 240, which controls the vehicle brake system 19 via a hydraulic control unit 250, in response to information received from the sensor cluster 216 and various other sensors 218. The ECU 240 also signals the trailer brake controller 170 in response to the stated information.

The main brake controller 22 may have both hardware and software portions. In the embodiment shown, the electronic control unit 240 has a hardware portion and a software portion 242. The hardware portion includes a brake pressure sensor 244, which is used to detect brake pressures in the brake system 19. Although not shown, the ECU 240 may also be configured and coupled to detect brake pressures in the trailer brake system 252.

The SCS module 12' receives information from many different sensors as will be described further below. The sensor information may be used for various determinations, such as to determine a wheel lifting event like an imminent rollover, determine various forces including normal forces at the wheels, determine a height and position of a mass, determine the instability trend of the vehicle dynamics as in unstable roll or yaw motions, determine the intentions of a driver, determine the feedforward control commands to drive actuators, determine feedback control commands for the desired functions, and the like.

The speed sensors 220, which may include wheel speed sensors and other speed sensors, are mounted at each corner of the vehicle 14 and generate vehicle speed signals 222 corresponding to the rotational speed of each wheel 28. The wheel speed sensors may be in the form of magnetic sensors, as represented by dashed line 223, or may be in some other form known in the art. The vehicle speed could also be determined by a global positioning system (GPS). The rest of the sensors used by the stability control system 12' may include the other decentralized sensors and a centralized motion sensor such as an IMU or a RSC sensor cluster mounted directly on a rigid surface of the vehicle body such as the vehicle floor or the chassis frame. Vehicle acceleration or deceleration can be determined as a numerical derivative of vehicle speed. Vehicle acceleration/deceleration can also be determined from the longitudinal acceleration signal provided by a longitudinal acceleration sensor, for example.

The software portion 242 includes a main trailer stability control (TSC) module 246. The TSC module 246 is used to receive information in the form of associated signals from a number of sensors, which may include sensors within the sensor cluster 216. The sensors, although not shown, may include a yaw rate sensor, a lateral acceleration sensor, a vertical acceleration sensor, a roll angular rate sensor, steering wheel angle sensor 238, a longitudinal acceleration sensor, and a pitch rate sensor and other sensors, actuator-specific sensors, and suspension position (height) sensors. A yaw rate input signal 254, a roll rate input signal 255, a lateral acceleration signal 256, a longitudinal acceleration signal 257, and a steering wheel angle signal 239 are shown. It should be noted that various combinations and sub-combinations of the sensors may be used. The sensor cluster 216 may also include an ambient temperature sensor providing an outside temperature signal to said TBC 170.

The TSC module 246 may also receive brake pressure information and feedback information in the form of a brake pressure signal 247 from the brake pressure sensor 244 and the trailer brake controller 170. The brake pressure sensor 244 could be in the HCU or on the master cylinder. The TSC module 246 also receives a trailer connectivity signal 258 from the TBC 170, a brake ON/OFF signal 260 from a brake pedal switch 261, a throttle position signal 262 and an engine torque signal 263 from a powertrain control module 295, and other various signals. The trailer connector 259 is coupled to the trailer electrical wiring 253. The TSC module 246 utilizes the received information and signals in generating a trailer sway signal 264, a trailer brake request signal 265, a brake pressure request signal 266, and an engine torque request signal 267. The brake request signal 266 may be in the form of a magnetic signal to the HCU 250 solenoids, as represented by dashed line 268.

The TSC module 246 may include sensing algorithms including but not limited to reference attitude and reference directional velocity determinations, global/relative attitude determination, directional velocity determination, sensor plausibility check, sensor signal conditioning, road parameter determination, and abnormal state monitoring.

The TSC module 246 may include various control units controlling the aforementioned sensing algorithms. More specifically, these units may include: a reference signal unit (reference signal generator (RSG)), which includes an attitude reference computation and a velocity reference computation, a sensor plausibility unit (sensor plausibility check unit (SPC)), an abnormal state unit (abnormal state monitoring unit (ASM)), a sensor signal compensating unit (SSC), a four wheel driver reference model and a sideslip angle computation. Signals generated from any one of the aforementioned units are referred to prediction of vehicle operation states signals.

The TSC module 246 is coupled to the hydraulic control unit (HCU) 250 and to the trailer brake controller 170. The HCU 250 controls the amount of brake pressure to the vehicle brake calipers, hence torque applied on the vehicle wheels 28. The TSC 246 controls the brake torques applied on the trailer wheels 30 through signaling 265 the trailer brake controller 170. The functions performed through the ECU 240 may include a RSC function and a YSC function. Other functional units such as an anti-lock-braking system (ABS) unit and a traction control system (TCS) unit may be provided. Those functions might be improved through utilizing the signals calculated in the TSC module 246. The TSC module 246 may include control function logic and control function priority logic.

Speed sensors 220 may include a variety of different speed sensors known to those skilled in the art. For example, suitable speed sensors may include a sensor at every wheel that is averaged by the ECU 240. The algorithms used in the ECU 240 may translate the wheel speeds into the travel speed of the vehicle and then pass these to the TSC 246. Yaw rate, steering angle, wheel speed, and possibly a slip angle estimate at each wheel may be translated back to the speed of the vehicle at the center of gravity. Various other algorithms are known to those skilled in the art. Speed may also be obtained from a transmission sensor. For example, when speed is determined while speeding up or braking around a corner, the lowest or highest wheel speed may not be used because of its error. Also, a transmission sensor may be used to determine vehicle speed instead of using wheel speed sensors.

The trailer 15 may include braking indicators, such as the trailer brake lamps 270 and other various indicators known in the art. The trailer 15 may have hydraulic, electric-magnet, electric-over-hydraulic or other known controllable trailer braking systems.

Figure 3:
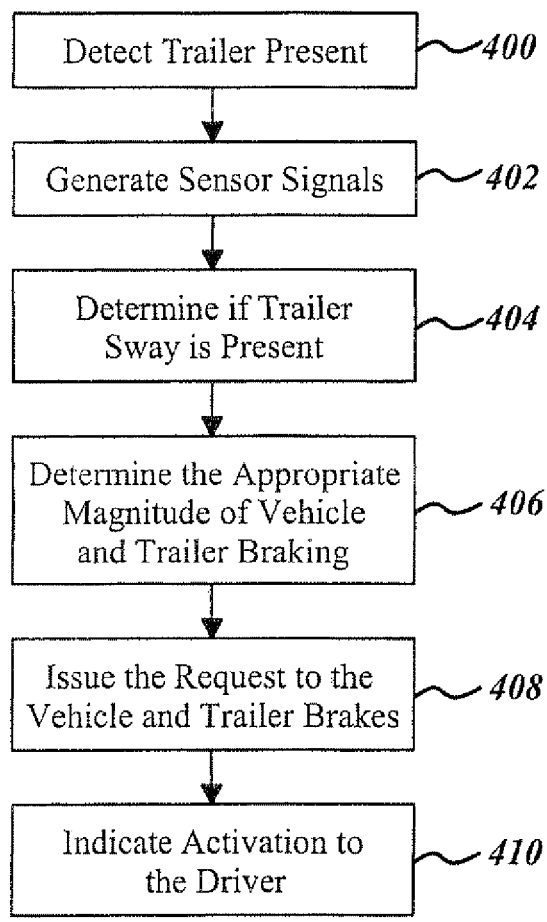
FIG. 3 is a logic flow diagram illustrating a method of operating a control system or a stability control system of a vehicle that is pulling a trailer in accordance with an embodiment of the present invention.

Referring now to FIG. 3, a logic flow diagram illustrating a method of operating a control system or a stability control system of a vehicle that is pulling a trailer in accordance with an embodiment of the present invention is shown. Although the following steps are described primarily with respect to the embodiments of FIGS. 1-2, they may be modified and applied to other embodiments of the present invention.

In step 400, the trailer brake controller 170, may determine if a trailer is connected. For example, the TBC 170 may apply current to magnets located within the electric trailer brakes. In response to the field generated by the magnets the trailer brake controller detects that a trailer is present and connected to the vehicle. Upon detection of a trailer the control system proceeds to step 402. This is only one way to proceed with control. Another method to determine whether the trailer is connected and to perform control is to detect sway oscillations in a certain frequency range, such as between 0.5-1.5 Hz, which occur for a specific period of time and that are not caused by steering changes. The frequencies with the specified inputs are equivalent to trailer sway, hence a trailer is connected.

In step 402, various sensor signals are generated from sensors, such as those described herein. In particular, one or more oscillation signals are generated from one or more sway detection sensors when the vehicle and trailer are experiencing a swaying motion. Yaw rate and lateral acceleration sensors may be considered sway detection sensors, in that the yaw rate signals and the lateral acceleration signals may be used to determine whether a vehicle and/or trailer are swaying or fishtailing. The oscillation signals may be indicative of the trailer swaying relative to the vehicle. In addition to the stated signals, vehicle speed signals and longitudinal acceleration signals are generated, which are indicative of the speed and longitudinal state of the vehicle. Although the stated sensors and signals are located and respectively generated on the vehicle, similar sensors (not shown) and signals may also be located and generated on or associated with the trailer. The vehicle speed signals may be generated via wheel speed sensors, engine speed sensors, drivetrain speed sensors, or the like, or via some other known vehicle speed generation method, like GPS.

In step 404, trailer sway is detected. The TSC module 246 determines whether trailer sway is present based upon the information received in step 402. When oscillation signals are generated and/or detected it is determined that corrective actions are to be performed to minimize and/or eliminate such oscillations. This may occur upon detection of the oscillations or when the magnitudes of the oscillation signals are above associated threshold levels. In general, when there is no steering wheel angle input or when the angle remains constant the vehicle is traveling in a relatively straight-line or steady-state (sub-limit) turning path. Straight-line path determination may also be made in response to the longitudinal acceleration of the vehicle. When the longitudinal acceleration signal is greater than an acceleration threshold it may also be determined that the vehicle is in a passing mode, such that it is passing another vehicle. Appropriate corrections may be made during passing, which may be different than when in a non-passing straight-line mode. Trailer braking may also be reduced if the outside air temperature is below a threshold (freezing or less) which may indicate the potential for slippery road conditions.

In step 406, a controller, such as the main controller 22 or the TSC module 246, determines the appropriate magnitudes for vehicle and trailer braking in response to the sensor signals and the sway information provided in steps 402 and 404.

Figure 4A:
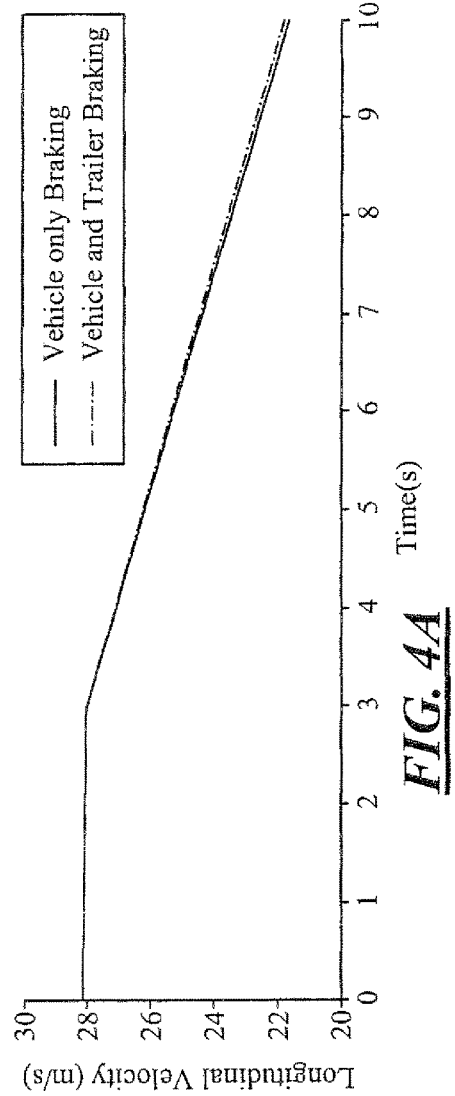
FIG. 4 is a simulation of two identical trailer sway events with different control strategies. The solid lines result from tow-vehicle-only braking. The dashed lines result from a combination of vehicle and trailer braking.
Figure 4B:
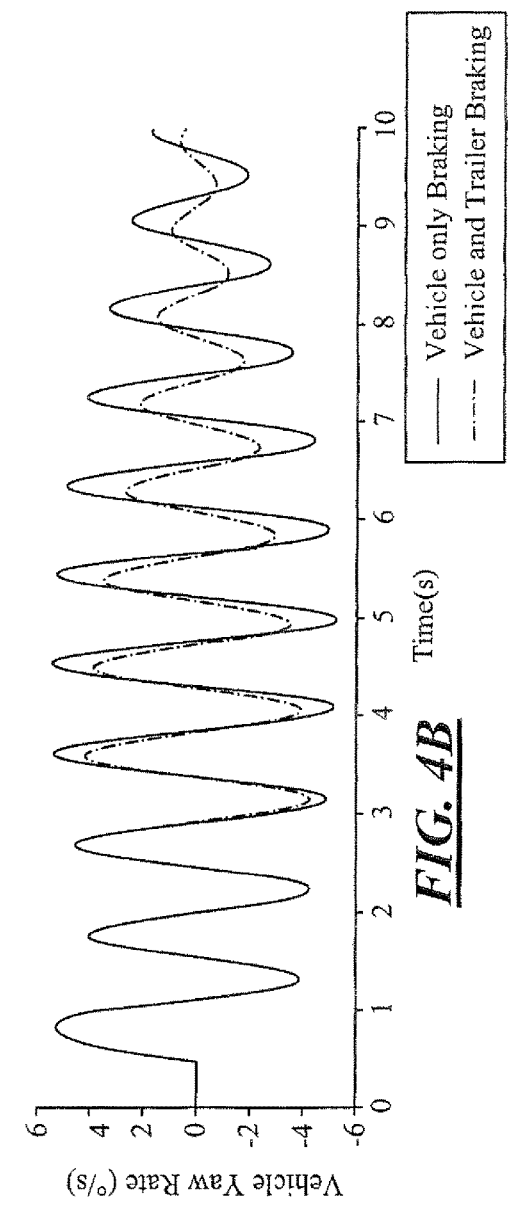

In step 408, a controller, such as the main controller 22 or the ECU 240 containing the TSC module 246, brakes or applies brake torque to vehicle wheels and/or trailer wheels in response to the determined magnitudes of step 406. The brake torque may be applied using hydraulics, electrical signals, pneumatics, or a combination thereof. The vehicle brakes are operated in collaboration with the trailer brakes to reduce the oscillations and stop the swaying motion. It can be seen in FIG. 4 that the trailer sway oscillations are more effectively damped by the combination vehicle/trailer braking even though the induced deceleration is nearly identical. Current trailer sway reduction systems use vehicle braking to reduce the vehicle's speed, therefore, adding trailer braking would be an improvement over the current method.

The trailer brakes may be operated alone or at applied torque levels that are greater than or proportional to the vehicle brake torque levels. The trailer applied brake torque levels can be greater, such that the speed of the trailer is reduced relative to the vehicle. This creates tension between the vehicle and the trailer, which helps to stabilize the vehicle/trailer system. One or more of each of the vehicle wheels and trailer wheels may be braked at any instance in time. The controller may also apply the brakes to reduce the speed of the vehicle and trailer to further stabilize the vehicle/trailer system.

The controller may also brake or reduce the engine speed of the vehicle to further slow down the vehicle with or without applying brake torque directly to the wheels. This is especially helpful when the vehicle or trailer wheels are on a low friction surface, on which a skid can occur, or when it is determined that skid or slip condition exists.

In step 410, the control system may indicate via an internal or external indicator, such as the vehicle internal indicator 180 or the brake lamps 270, brake activation, braking system status information, and other related information. This information may be provided external or internal to the vehicle and/or to a vehicle operator. This information may also be stored, viewed, and downloaded for future review and/or evaluation. The viewing and downloading may be to an offboard or offsite system.

The above tasks may be performed via any one or more of the herein mentioned controllers, control systems, stability control systems, or the like.

The above-described steps are meant to be illustrative examples; the steps may be performed sequentially, synchronously, simultaneously, or in a different order depending upon the application.

While particular embodiments of the invention have been shown and described, numerous variations and alternate embodiments will occur to those skilled in the art. Accordingly, it is intended that the invention be limited only in terms of the appended claims.

What is claimed is:

1. A control system for a vehicle comprising:
   a speed sensor generating a vehicle speed signal;
   a sway detection sensor generating an oscillation signal in response to trailer oscillations in a predetermined frequency range for at least a predetermined period of time;
   at least one vehicle brake;
   a brake control coupled to said at least one vehicle brake and associated with at least one trailer brake;
   a stability control system coupled to said speed sensor, said sway detection sensor, and said brake control; and
   a controller coupled to said stability control system and braking at least one of said at least one vehicle brake and said at least one trailer brake and in response to said oscillation signal.

2. A system as in claim 1 wherein said controller brakes said at least one vehicle brake in collaboration with said at least one trailer brake.

3. A system as in claim 2 wherein said controller actively brakes at least one of said at least one trailer brake and said at least one vehicle brake upon oscillation detection.

4. A system as in claim 2 wherein said controller actively brakes at least one of said at least one trailer brake and said at least one vehicle brake when said vehicle speed signal is greater than a predetermined speed.

5. A system as in claim 2 wherein upon oscillation detection said controller actively brakes at least one trailer brake according to brake magnitude output available by the controller for said at least one vehicle brake and said at least one trailer brake.

6. A system as in claim 2 wherein upon oscillation detection said controller actively brakes said at least one trailer brake based on vehicle deceleration.

7. A system as in claim 2 wherein said controller actively brakes said at least one trailer brake proportional to a vehicle braking request.

8. A system as in claim 1 comprising a longitudinal acceleration sensor generating a longitudinal acceleration signal, said controller braking said at least one trailer brake when said longitudinal acceleration signal is greater than a predetermined threshold.

9. A system as in claim 1 comprising a longitudinal acceleration sensor generating a longitudinal acceleration signal, said controller braking said at least one vehicle brake and said at least one trailer brake when said longitudinal deceleration signal is less than a predetermined threshold.

10. A system as in claim 9 where said controller actively brakes at least one of said at least one trailer brake with a deceleration target during trailer oscillation detection and in conjunction with deceleration generated by controller actively braking at least one of said vehicle brakes.

11. A system as in claim 1 comprising an external temperature sensor, said controller actively braking at least one of said trailer brakes as a function of the external temperature.

12. A system as in claim 1 comprising a lateral acceleration sensor generating a lateral acceleration signal, said controller braking said at least one trailer brake when said lateral acceleration signal is less than a predetermined threshold.

13. A system as in claim 1 wherein said sway detection sensor is selected from at least one of a yaw rate sensor and a lateral acceleration sensor.

14. A system as in claim 1 wherein said oscillation signal comprises yaw rate information.

15. A system as in claim 1 wherein said oscillation signal comprises acceleration information.

16. A system as in claim 1 wherein said oscillation signal comprises yaw acceleration information.

17. A system as in claim 1 wherein said controller is onboard the vehicle.

18. A system as in claim 1 wherein said controller brakes at least one of said at least one vehicle brake and said at least one trailer brake in response to a trailer detection signal.

19. A system as in claim 1 wherein said controller actively brakes a plurality of said at least one trailer brake and said at least one vehicle brake on opposite sides of at least one of the vehicle and trailer.

20. A control system for a vehicle comprising:
a sway detection sensor generating an oscillation signal in response to detecting trailer oscillations within a predetermined frequency range for at least a predetermined period of time;
at least one vehicle brake;
a brake control coupled to said at least one vehicle brake and associated with at least one trailer brake;
a stability control system coupled to said sway detection sensor and said brake control; and
a controller coupled to said stability control system and applying a proportionally greater braking force with said at least one trailer brake than said at least one vehicle brake in response to said oscillation signal.

21. A system as in claim 20 further comprising a speed sensor generating a vehicle speed signal, said controller applying said proportionally greater braking force when said vehicle speed signal is greater than a predetermined speed.

22. A system as in claim 20 wherein said controller only applies said proportionally greater braking force to said at least one trailer brake.

23. A system as in claim 20 wherein said controller applies said proportionally greater braking force to said at least one vehicle brake and said at least one trailer brake.

24. A system as in claim 20 wherein said controller applies said proportionally greater braking force in response to a trailer detection signal.

25. A method of controlling a stability control system of a vehicle that is pulling a trailer comprising:
generating a vehicle speed signal;
generating an oscillation signal indicative of a trailer swaying relative to the vehicle, said oscillation signal being generated on the vehicle only and in response to detecting trailer oscillations within a predetermined frequency range for at least a predetermined period of time;
braking at least one trailer brake when said vehicle speed signal is greater than a predetermined speed and in response to said oscillation signal.

26. A method as in claim 25 further comprising generating a trailer present signal and braking said at least one trailer brake in response to said trailer present signal.

27. A method as in claim 25 further comprising braking at least one vehicle brake in collaboration with said at least one trailer brake in response to said oscillation signal.

\* \* \* \* \*